United States Patent [19]
Jahns

[11] Patent Number: 5,165,861
[45] Date of Patent: Nov. 24, 1992

[54] MAGNETOHYDRODYNAMIC VACUUM PUMP

[75] Inventor: Gary L. Jahns, Poway, Calif.

[73] Assignee: Microwave Plasma Products Inc., San Diego, Calif.

[21] Appl. No.: 524,281

[22] Filed: May 16, 1990

[51] Int. Cl.$^5$ .............................................. H02K 44/02
[52] U.S. Cl. ........................................ 417/50; 417/53; 417/205; 310/11
[58] Field of Search ............... 417/50, 53, 205; 310/11

[56] References Cited

U.S. PATENT DOCUMENTS

| | | | |
|---|---|---|---|
| 3,160,100 | 12/1964 | Poppendiek | 417/50 |
| 3,241,490 | 3/1966 | Ricateau et al. | 310/11 |
| 3,379,904 | 4/1968 | Wallis et al. | 310/11 |
| 3,508,087 | 4/1970 | Millet et al. | 310/11 |
| 4,641,060 | 2/1987 | Dandl | 376/121 |
| 4,797,068 | 1/1989 | Hayakawa et al. | 417/205 |

*Primary Examiner*—Richard A. Bertsch
*Assistant Examiner*—David W. Scheuermann

[57] ABSTRACT

This invention relates to the technology of preparing a vacuum by removing gases from an enclosed volume and to the use of magnetized plasma as the working fluid in a vacuum pump. The pumping action is created by ionizing the gas to be pumped with microwave radiation and then by exerting magnetohydrodynamic forces on the plasma to flow through a region of constricted space which impedes the backflow of neutral gas thus causing compression of the gas in the exit region. The magnetohydrodynamic forces arise as the vector product of a plasma current j and a magnetic field B, which are imposed on the plasma by a structure of electrodes and permanent magnets. The geometry of this structure is such that the magnetic force and the plasma current between electrodes are approximately perpendicular to each other and to the axis of the device. The resulting $j \times B$ force then creates an axial plasma flow and neutral compression. This invention additionally relates to the molecular dissociation of toxic or corrosive constituents of the gas being pumped, as a consequence of the ionization process, and to the benefit that the toxics or corrosives are destroyed without an additional process required. This invention additionally relates to the production of desirable chemical reactions among intentionally-introduced gases that are enhanced by the high temperature and ionized state of the resulting plasma.

27 Claims, 2 Drawing Sheets

MAGNETOHYDRODYNAMIC VACUUM PUMP

BACKGROUND OF THE INVENTION

By the word vacuum is meant the condition where the gas pressure is reduced to significantly less than atmospheric pressure. On the surface of the earth, such conditions can only be sustained in an enclosure that is impervious to gas flow and from which atmospheric gases are actively removed by some kind of vacuum pump. Gaseous pressure is measured officially in SI units of Pascals, or Newtons/m$^2$, and more commonly in units of Torr, which relates to the pressure required to support a column of Mercury at a height of 1 millimeter. Mean atmospheric pressure is $1.013 \times 10^5$ Pa or 760 Torr.

Industrial applications for vacuum (and hence vacuum pumps) include chemical procedures in which materials are fabricated or modified in a controlled environment. Thin film processing, by deposition, cleaning, and etching of material under vacuum forms one of the largest applications. More specifically, these processes are used in the manufacture of large-scale integrated electronic circuits where the goal of small feature size requires the cleanliness and the chemical control that is available in a vacuum.

Existing vacuum pumps fall into several classes according to the principle used to achieve a pumping action. Each class of pump is found to be effective over a characteristic pressure range. Often, two or more stages of pumping are utilized to achieve or maintain a pressure differential from high vacuum to atmospheric pressure: The initial stages compress the gas from a very low pressure to successively higher ones, and the final stage compresses the gas further for exhaust to atmosphere. Final-stage, or backing, pumps commonly are of a mechanical piston design. Oil-lubricated mechanical pumps can operate at inlet pressures down to $10^{-3}$ Torr; dry-lubricated pumps required for vacuum processes that cannot tolerate oil contamination go down to $10^{-2}$ Torr.

By the word plasma is meant the state of matter where atoms have been ionized, resulting in a gas of electrically charged ions and electrons. Vacuum pumps using a plasma as the working fluid have been proposed before: In particular, reference is made to U.S. Pat. No. 4,641,060 issued Feb. 3, 1987 to R. A. Dandl, where the gas being pumped is ionized and constrained to flow along magnetic field lines through baffle structures that restrict the backflow of neutral gases. The Dandl pump cannot compress the pumped gas to pressures higher than $10^{-3}$ Torr, which is a handicap for industrial processes requiring extreme cleanliness and oil-free backing pumps.

By the word magnetohydrodynamics and its abbreviation MHD is meant a fluid-model description of a plasma wherein the electrical resistivity of the plasma is not important. Under these conditions, the plasma behaves as a fluid whose electrical currents are influenced by magnetic fields. Specifically, the force equation for the fluid plasma is:

$$\rho \frac{\partial v}{\partial t} + (v \cdot \nabla)v = j \times B - \nabla p \quad (1)$$

where $\rho$ is the mass density of the plasma, v is the velocity of a fluid element of the plasma, $\nabla p$ is the gradient of the plasma pressure, j is the plasma electrical current, and B is the magnetic field vector.

An object of the present invention is to be an effective initial or intermediate stage in a clean, oil-free vacuum pumping system, suitable for processing applications requiring stringent purity and chemical control. Specifically, this requires the achievement of a compression of the pumped gas to a minimum of $10^{-2}$ Torr so that oil-free backing pumps may be used.

A further object of this invention is to be a pump with high throughput when the inlet pressure is in the range of $10^{-4}$ to $10^{-3}$ Torr to maximize the processing rate in deposition, cleaning, and etching operations.

A further object of this invention is to be a device which destroys toxic or corrosive gases in the effluent which is simultaneously being pumped by this device.

A further object of this invention is to be a device in which the elevated temperatures of a plasma formed from pre-selected reactants promotes desired chemical reactions in thin-film surfaces onto which the plasma impinges.

SUMMARY OF THE INVENTION

In accordance with these and other objects, the invention, briefly described, is an evacuable chamber with an inlet to further regions to be evacuated, an outlet to a backing pump that can exhaust the pumped gas to atmospheric pressure, a physical coupling to a microwave generator (including waveguide, vacuum window, and a baffle inside the vacuum vessel) for ionizing the incoming neutral gas, and a structure in the exit region consisting of electrodes, permanent ferromagnets and spaces which constitute channels for plasma flow.

This latter structure will be referred to hereafter as the MHD Channel Structure, for reasons which will now be described. The electrodes are metal plates separated by the ferromagnets. Between any two electrodes, the magnets are separated by spaces, or channels, and the orientation of the magnetic field is from one magnet to the next, parallel to the electrodes. The magnetic field direction reverses between adjacent columns of magnets, and the electrodes are connected to a voltage source such that they alternate in polarity. Thus, while electric currents and magnetic fields alternate in direction across the structure, the vector product $j \times B$ is everywhere in the same direction, parallel to the axes of the channels.

The purpose of establishing these crossed electric currents and magnetic fields is to apply magnetohydrodynamic (MHD) forces to the plasma created at one end of the Channel Structure and to accelerate the plasma through the channels. Since the plasma is formed from entering neutral gas and acquires a unidirectional motion, this process achieves the desired pumping action.

Applying EQ. 1 to the case of the Channel Structure, both the $\nabla p$ and $j \times B$ terms can be used to accelerate the plasma from the source (i.e., microwave formation) region to the exit region. To the extent that this flow can be made large enough to exceed the backstreaming of neutrals through the channels, a compression of the neutral gas can be achieved.

The range of pressures over which the pump may be expected to operate is determined by the pressures at which the microwave energy is effectively absorbed. Plasma formation is aided by the fringing magnetic field in front of the Channel Structure which includes a layer in which the field level is at the electron cyclotron resonance of the applied microwave frequency, in a manner essentially similar to that described by Dandl (1987) and referred to there as electron cyclotron heating. Under conditions of electron cyclotron resonance, effective plasma formation down to neutral pressures of $10^{-5}$ Torr is possible.

The Channel Structure possesses several other virtues. The alternating direction of the magnetic field from column to column of permanent magnets is a configuration of minimum potential energy such that all magnets are attracted to each other, and the field rapidly decreases in strength as one moves away from the Structure. The fringing magnetic field in front of the Structure has variations in strength with the spatial periodicity of the Structure itself, to the effect that multiple magnetic mirrors and hence magnetic traps for charged particles exist. Containment of hot electrons in the traps serve to promote ionization, as discussed by dandl (1987).

This invention meets and exceeds the needs of the stated objects in several significant ways. The MHD force arising from the crossed current and magnetic field actively accelerates plasma through the channels, so pumping action is maintained at high pressures (and thus shorter mean free paths) than is possible otherwise.

Further benefits derive from the efficient geometry of the MHD Channel Structure. It provides a strong, compact magnetic field to drive the plasma flow in the channels plus the electron cyclotron resonance in the fringing field without bulky electromagnetic coils. Its periodic structure can be increased to any size desired, with throughput scaling as the surface area.

The invention possesses additional benefits: It has no moving parts or lubricants, and thus is compatible with processing requiring extreme cleanliness. The ionization process can be used to dissociate molecules of toxic or corrosive effluent gases, providing a means of simultaneously pumping and destroying toxics and corrosives. The device can be used as a plasma chemistry reactor by introducing constituents that will react to desired products at rates that are enhanced by the elevated temperature and ionized nature of the plasma.

BRIEF DESCRIPTION OF THE DRAWINGS

In accordance with the above description of the preferred embodiment.

DESCRIPTION OF THE PREFERRED EMBODIMENT

Figure 1:
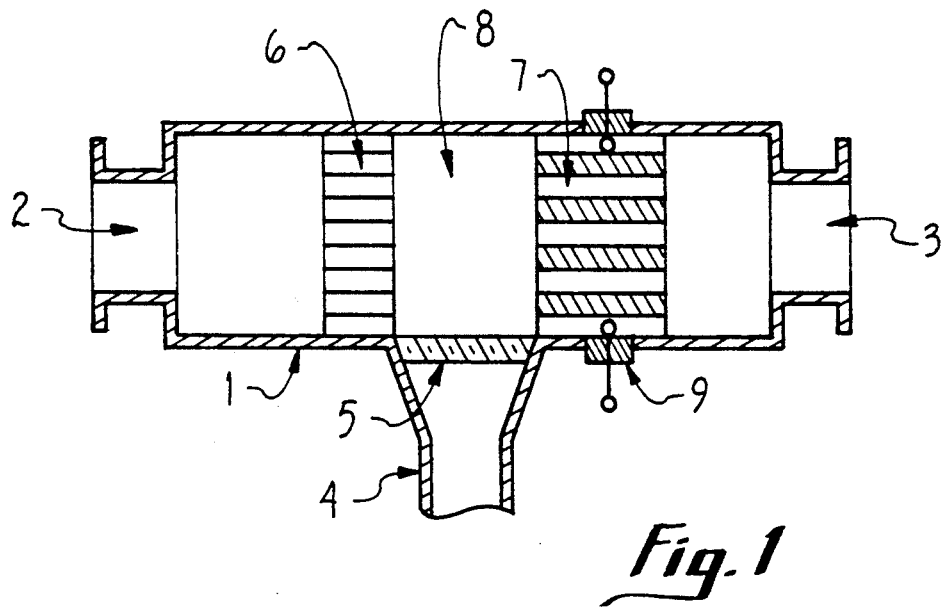
FIG. 1 shows: 1 The vacuum vessel of the device, with 2 inlet orifice and 3 exit orifice; 4 waveguide coupling from microwave source; 5 vacuum-tight microwave-transparent window; 6 passive baffle on inlet side; 7 MHD Channel Structure on exit side; 8 the plasma source region between baffle and Channel Structure; and 9 electrical feedthroughs for connections to electrodes of the Channel Structure.
Figure 2:
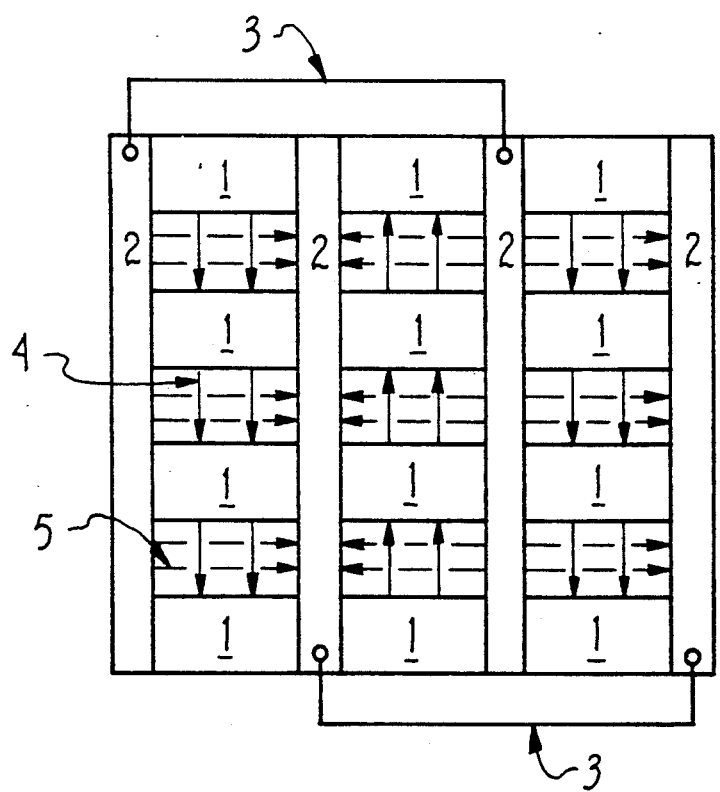
FIG. 2 shows details of the MDH Channel Structure as viewed along the axis of the vacuum vessel: 1 permanent ferromagnets, 2 electrodes; 3 leads connecting electrodes alternately; 4 light solid lines indicating the direction of the magnetic field B; 5 dashed lines indicating the direction of plasma current flow j due to the voltage applied to the electrodes. The direction of the force j×B is then everywhere directed into the page (i.e., along the axis of the pump).
Figure 3:
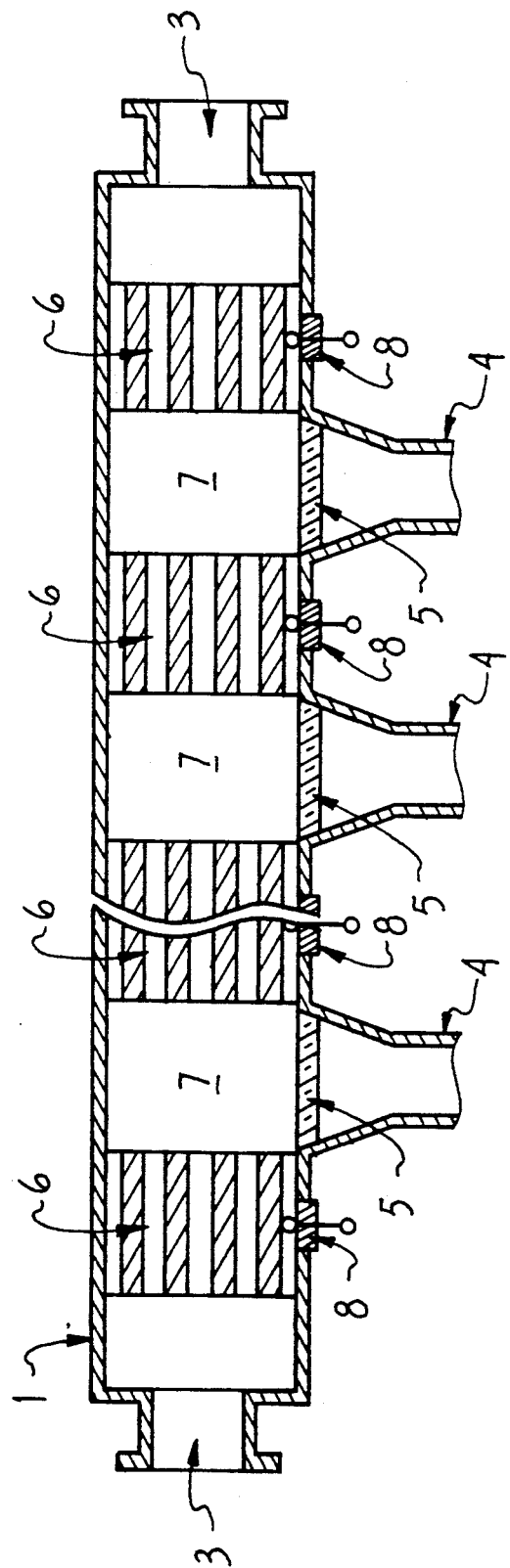
FIG. 3 shows the general alternate preferred embodiment consisting of an arbitrary number of stages, comprised of: 1 the vacuum vessel; 2 inlet orifice; 3 exit orifice; 4 multiple waveguide couplers; 5 multiple vacuum-tight microwave-transparent windows; 6 multiple MHD Channel Structures; 7 multiple plasma source regions between Channel Structures; and 8 vacuum-tight electrical feedthroughs for connections to the electrodes of the Channel Structures.

The preferred embodiment, as depicted in the drawings, consists of a vacuum envelope or vessel which is free of leaks to atmosphere. The vessel includes an inlet orifice which is intended to be connected to other vacuum chambers for the purpose of evacuating them. It also includes an outlet or exit orifice, intended for connection to a backing pump such as a mechanical vacuum pump, for the purpose or removing the pumped gas and discharging it to atmospheric pressure.

It is necessary to introduce microwave radiation for the purpose of ionizing the gas being pumped. Microwave energy is directed through a waveguide structure from a microwave source (such as a magnetron, klystron, or other source) through a window that is transparent to microwave radiation and maintains the vacuum integrity of the vessel. Inside the vessel, a passive baffle prevents microwaves from travelling to the input orifice while permitting gas to flow freely. Similarly, an MHD Channel Structure prevents microwaves from travelling to the exit orifice.

The MHD Channel Structure is oriented so that the axes of the channels lead from the plasma source region (i.e., the space between the passive baffle and the MHD Channel Structure where microwaves are introduced into the chamber) to the exit region. Electrical connections to the electrodes of the Channel Structure pass through the vacuum envelope on vacuum-tight insulated feedthroughs.

The above is a description of a single-stage pump where all compression of gas occurs across a singe MHD Channel Structure. An alternate preferred embodiment of the invention is with everything as described above with the exception that the passive baffle is replaced by a second Channel Structure which counters the plasma pressure gradient which tends to force plasma toward the inlet.

A general alternate preferred embodiment is that of a multiple-stage pump wherein a larger overall compression ratio is developed as a consequence of arranging a number of MHD Channel Structures and plasma source regions (with microwave inputs) in series such that one Channel Structure compresses plasma into the source region of the next Channel Structure in the chain.

What is claimed is:

1. A method of vacuum pumping comprising the steps of:
   (a) positioning multiple channels whose axes are generally directed from an inlet region to an exit region, which serve to restrict the flow of a gas between said inlet region and said exit region,
   (b) ionizing said gas, thereby creating a plasma,
   (c) establishing magnetic fields generally in directions across said channels,
   (d) establishing electric currents generally in directions across said channels and in every case perpendicular to said magnetic fields such that resulting j×B forces exerted on said plasma are generally in the direction from said inlet region to said exit region, whereby a net throughput of said gas results as a consequence of motion of said plasma in response to said j×B forces, and a pressure gradient is supported in said channels.

2. The method of vacuum pumping of claim 1, wherein:
(a) said electric currents are established by electrodes located in regions between said channels, and
(b) said magnetic fields are established by permanent magnets located in regions between said channels.

3. The method of vacuum pumping of claim 2, wherein ionizing said gas comprises applying microwave radiation, whereby the frequency of said microwave radiation satisfies a condition of electron cyclotron resonance at points in fringing magnetic fields of said permanent magnets.

4. The method of vacuum pumping of claim 2, wherein said magnetic fields are established by permanent magnets arranged in columns with said channels interposed between said permanent magnets and with said magnetic fields in a single column oriented in the same general direction, and with said direction of magnetic fields reversing in adjacent columns, and with said electric currents reversing in direction between said columns so as to maintain the direction of said j×B forces to be generally from said inlet region to said exit region, whereby results a compact arrangement of said magnetic fields, said electric currents, and said channels which may be increased in total area indefinitely by adding more of said magnets and said electrodes with the consequence that the throughput of said gas is likewise increased.

5. The method of vacuum pumping of claim 4, wherein ionizing said gas comprises applying microwave radiation, whereby the frequency of said microwave radiation satisfies said condition of electron cyclotron resonance at points in fringing magnetic fields of said permanent magnets.

6. An apparatus for vacuum pumping that is oil-free and contains no moving parts comprising:
(a) an evacuable chamber with an inlet orifice and an exit orifice,
(b) a channel structure penetrated by multiple channels whose axes are generally directed from said inlet orifice to said exit orifice, which serve to restrict the flow of a gas between said inlet orifice and said exit orifice,
(c) ionization means of ionizing said gas, thereby creating a plasma,
(d) magnetic field means of establishing magnetic fields generally in directions across said channels,
(e) electric current means of establishing electric currents generally in directions across said channels and in every case perpendicular to said magnetic fields such that resulting j×B forces exerted on said plasma are generally in the direction from said inlet orifice to said exit orifice,
whereby net throughput of said gas results as a consequence of motion of said plasma in response to said j×B forces, and a pressure gradient is supported in said channels.

7. The apparatus for vacuum pumping of claim 6, wherein:
(a) said electric current means comprises electrodes imbedded in said channel structure between said channels, and
(b) said magnetic field means comprises permanent magnets imbedded in said channel structure between said channels.

8. The apparatus for vacuum pumping of claim 7, wherein said ionization means comprises means of applying microwave radiation, whereby the frequency of said microwave radiation satisfies a condition of electron cyclotron resonance at points in fringing magnetic fields of said permanent magnets.

9. The apparatus for vacuum pumping of claim 8, wherein said means of applying microwave radiation comprises a waveguide, a vacuum-tight microwave-transparent window that allows said microwave radiation to propagate into said evacuable chamber, and a baffle means located between said inlet orifice and said channel structure which serves to prevent said microwave radiation from propagating to said inlet orifice while allowing said gas to flow between said inlet orifice and said channel structure.

10. The apparatus for vacuum pumping of claim 9, wherein said permanent magnets with said channels interposed between said permanent magnets are arranged in columns, and with said magnetic fields of all said permanent magnets in a single column oriented in the same general direction, and with said direction of magnetic fields being reversed in adjacent columns, and with said electric currents reversed in direction between said columns so as to maintain the direction of said j×B forces to be generally from said inlet orifice to said exit orifice, whereby results a periodic structure of said permanent magnets and said electrodes with interposed channels, which may be increased in total area indefinitely by adding more of said magnets, said electrodes, and said interposed channels with the consequence that the throughput of said gas is likewise increased.

11. The apparatus for vacuum pumping of claim 10, further comprising materials of construction of said evacuable chamber, said channel structure, and said electrodes that are inert, whereby reactive gases may be pumped without damage incurred by said materials of construction.

12. The apparatus for vacuum pumping of claim 10, wherein said ionization means comprises means of applying microwave radiation, whereby the frequency of said microwave radiation satisfies said condition of electron cyclotron resonance at points in said fringing magnetic fields of said permanent magnets.

13. The apparatus for vacuum pumping of claim 12, further comprising materials of construction of said evacuable chamber, said channel structure, and said electrodes that are inert, whereby reactive gases may be pumped without damage incurred by said materials of construction.

14. The apparatus for vacuum pumping of claim 12, wherein said means of applying microwave radiation comprises said waveguide, said vacuum-tight microwave-transparent window, and said baffle means located between said inlet orifice and said channel structure.

15. The apparatus for vacuum pumping of claim 14, wherein said baffle means is an additional channel structure, whereby said j×B forces in said channels of said additional channel structure impede the flow of said plasma to said inlet orifice.

16. The apparatus for vacuum pumping of claim 14, further comprising materials of construction of said evacuable chamber, said channel structure, said electrodes, said baffle means, and said vacuum-tight microwave-transparent window that are inert, whereby reactive gases may be pumped without damage incurred by said materials of construction.

17. The apparatus for vacuum pumping of claim 16, wherein said baffle means is an additional channel structure.

18. An apparatus for vacuum pumping that is oil-free and contains no moving parts comprising:
(a) an evacuable chamber with an inlet orifice and an exit orifice,
(b) a series of channel structures oriented such that said gas flowing between said inlet orifice and said exit orifice must pass successively through each of said series of channel structures,
(c) ionization means of ionizing said gas, thereby creating a plasma,
(d) magnetic field means of establishing magnetic fields generally in directions across multiple channels in each of said series of channel structures,
(e) electric current means of establishing electric currents generally in directions across said channels and in every case perpendicular to said magnetic fields such that resulting $j \times B$ forces exerted on said plasma are generally in the direction from said inlet orifice to said exit orifice,
whereby net throughput of said gas results as a consequence of motion of said plasma in response to said $j \times B$ forces, and said pressure gradient is supported in said channels.

19. The apparatus for vacuum pumping of claim 18, wherein:
(a) said electric current means comprises electrodes imbedded in said series of channel structures between said channels, and
(b) said magnetic field means comprises permanent magnets imbedded in said series of channel structures between said multiple channels.

20. The apparatus for vacuum pumping of claim 19, wherein said ionization means comprises means of applying microwave radiation, whereby the frequency of said microwave radiation satisfies a condition of electron cyclotron resonance at points in fringing magnetic fields of said permanent magnets.

21. The apparatus for vacuum pumping of claim 20, wherein said means of applying microwave radiation comprises a series of waveguides and vacuum-tight microwave-transparent windows that allow said microwave radiation to propagate into said evacuable chamber.

22. The apparatus for vacuum pumping of claim 19, wherein said permanent magnets with said channels interposed between said permanent magnets are arranged in columns, and with said magnetic fields of all said permanent magnets in a single column oriented in the same general direction, and with said direction of magnetic fields being reversed in adjacent columns, and with said electric currents reversed in direction between said columns so as to maintain the direction of $j \times B$ forces to be generally from said inlet orifice to said exit orifice, whereby results a series of periodic structures of said permanent magnets and said electrodes with interposed channels, which may be increased in total area indefinitely by adding more of said magnets, said electrodes, and said interposed channels with the consequence that the throughput of said gas is likewise increased.

23. The apparatus for vacuum pumping of claim 22, further comprising materials of construction of said evacuable chamber, said series of channel structures, and said electrodes that are inert, whereby reactive gases may be pumped without damage incurred by said materials of construction.

24. The apparatus for vacuum pumping of claim 22, wherein said ionization means comprises means of applying microwave radiation, whereby the frequency of said microwave radiation satisfies said condition of electron cyclotron resonance at points in said fringing magnetic fields of said permanent magnets.

25. The apparatus for vacuum pumping of claim 24, further comprising materials of construction of said evacuable chamber, said series of channel structures, and said electrodes that are inert, whereby reactive gases may be pumped without damage incurred by said materials of construction.

26. The apparatus for vacuum pumping of claim 24, wherein said means of applying microwave radiation comprises a series of waveguides and vacuum-tight microwave-transparent windows.

27. The apparatus for vacuum pumping of claim 26, further comprising materials of construction of said evacuable chamber, said series of channel structures, said electrodes, and said vacuum-tight microwave-transparent windows that are inert, whereby reactive gases may be pumped without damage incurred by said materials of construction.

* * * * *